Nov. 15, 1932.   W. L. AVERY   1,887,880
MEANS FOR PRODUCING FLUID PRESSURE
Filed Jan. 30, 1930
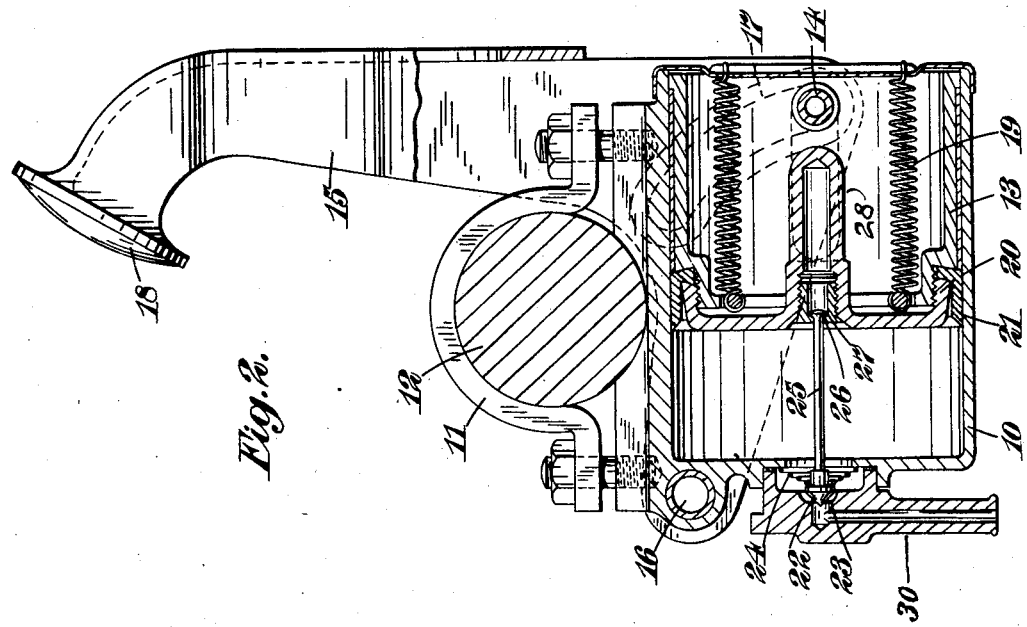
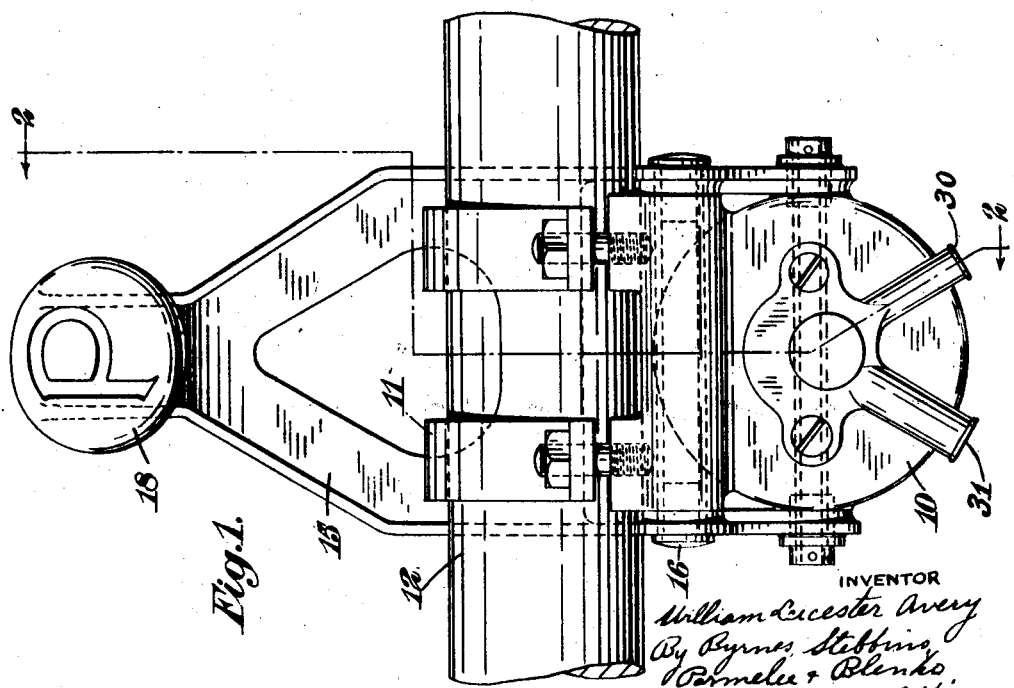
INVENTOR
William Leicester Avery
By Byrnes, Stebbins,
Parmelee & Blenko
His Attys.

Patented Nov. 15, 1932

1,887,880

UNITED STATES PATENT OFFICE

WILLIAM LEICESTER AVERY, OF LONDON, ENGLAND, ASSIGNOR TO THE INDIA RUBBER, GUTTA PERCHA AND TELEGRAPH WORKS COMPANY LIMITED, OF LONDON, ENGLAND, A BRITISH COMPANY

MEANS FOR PRODUCING FLUID PRESSURE

Application filed January 30, 1930, Serial No. 424,588, and in Great Britain September 21, 1929.

The present invention is for improvements in or relating to apparatus for producing super-normal or sub-normal pressure in a fluid system for operating a brake or brakes, for example on the landing wheels of an aeroplane.

The type of such apparatus with which the present invention is concerned is that comprising a chamber to contain the fluid and means (e. g. a piston) for increasing or reducing the effective volume of said chamber to suck in or expel fluid through an orifice by relative movement between two members of the apparatus (e. g. a cylinder and a piston).

According to the present invention pressure-applying apparatus of the type specified is characterized by an operating lever pivoted to one of the members and having cam engagement with the other of the members between which relative movement is required.

Preferably the cam is so shaped and arranged that the velocity ratio of the movement of the operating lever to the relative movement produced thereby increases as the lever moves away from its normal position of rest.

One of the members between which relative movement is required may be fixed and the operating lever either may be pivoted about a fixed axis and have cam engagement with the movable member.

A modification of the invention includes the provision of means comprising a valve for establishing communication between the chamber and a fluid supply, characterized by means operatively connecting the valve and the movable member such that the valve is opened only when the movable member reaches or approximates its normal position of rest.

In order that the invention may be more readily understood, a specific example thereof will now be described with reference to the accompanying drawing, in which—

Figure 1 is an elevation, from what will be described as the front end, of an apparatus for producing pressure for operating brakes, and Figure 2 is a section on the line 2—2 of Figure 1.

Like reference numerals indicate like parts in both figures.

The apparatus comprises a cylinder 10 fixed by means of a saddle 11 to a member 12 of the frame of the machine, or in the case of an aeroplane to a rudder-bar, and having within it a movable piston 13. The skirt of the piston is of considerable length and projecting transversely through it is a gudgeon pin 14 near the rearward end of it. Each end of the pin projects through a slot extending parallel to the axis of the cylinder through the wall thereof.

The piston is operated by means of a pair of L-shaped levers 15 one on each side of the cylinder, each of which is pivoted at the end of one arm about a fixed axis 16. Each of these levers has a cam slot 17 in the neighbourhood of its bend to engage one end of the gudgeon pin 14. The other arms of the levers come together and are provided with a pedal 18. The piston is normally urged rearwardly by means of tension springs 19. The cam engagement between the pin and the levers is such as to be operative in both directions of movement of the lever. Thus, if preferred, the retraction of the piston could be effected by a spring acting on the operating levers instead of on the piston.

The front of the piston is provided with a screwed cap 20 which serves to hold in position a washer 21 forming a fluid-tight joint with the walls of the cylinder. The opposing face of the cylinder has in it a recess communicating with connector tubes 30, 31 to communicate respectively with a fluid supply and with the brakes to be operated. The communication with the pipe 30 and fluid supply is, however, normally closed by means of a conical valve 22 which is urged into a seating 23 by means of a spring 24. The valve is provided with a stem 25 extending through an aperture in the cap 20 of the piston, and having at its opposite end a head 26. A screwed sleeve 27 fits in this aperture and has in it a central bore through which the stem 25 but not the head 26 can pass. Thus when the piston is in its rearmost position the sleeve 27 will engage the head of the rod 25 and lift the valve 22 off its seating. At all other positions of the piston the valve is closed and communication with the fluid supply is cut off. The aperture in the piston cap is sealed against escape of pressure fluid by a hollow closed projection 28 formed on the back of the piston cap and affording a cavity to accommodate the valve stem.

The cam slots in the operating levers are so arranged that the leverage of the lever on the piston increases as the piston is moved forwardly in the cylinder, so that for any movement of the lever through a given angle the movement of the piston decreases as the piston moves forwardly in the cylinder.

With means according to this invention a comparatively high fluid pressure can be obtained in a liquid system with comparatively small movement of the lever and without excessive pressure being applied to the pedal. This is particularly due to the fact that the leverage of the lever in relation to the movement of the piston increases as the piston moves forwardly in the cylinder (i. e. to the left in Figure 2). Further, the size of the cylinder and accompaniments can be comparatively small and thus render the means particularly suitable for such uses as operating brakes on air-craft wheels.

I claim:—

1. Pressure-applying apparatus for fluid-operated wheel-brakes comprising in combination a cylinder to contain the fluid, a piston slidable within said cylinder, a gudgeon pin projecting transversely through the piston and extending through longitudinal slots in the cylinder wall, and a pair of L-shaped operating levers one on each side of the cylinder each pivoted at one end about a fixed axis and having a cam slot in the neighborhood of the bend to engage the gudgeon pin and having their other ends joined together for simultaneous operation.

2. Pressure-applying apparatus for fluid-operated wheel-brakes comprising in combination a cylinder to contain fluid, a piston slidable within said cylinder and having an aperture therein, an operating lever for producing movement of the piston and means for establishing communication between the chamber and a fluid supply, said means comprising a valve, a stem on said valve slidable lengthwise in the aperture in the piston in the direction of movement of the latter and a head or enlargement on said stem to be engaged by the piston just before the latter reaches its normal position of rest in order to open the valve.

3. Pressure-applying apparatus for fluid-operated wheel-brakes comprising in combination a cylinder to contain fluid, a piston slidable within said cylinder and having an aperture therein, an operating lever for producing movement of the piston and means for establishing communication between the chamber and a fluid supply, said means comprising a valve of conical form, a stem on said valve slidable lengthwise in the aperture in the piston in the direction of movement of the latter, and a head or enlargement on said stem to be engaged by the piston just before the latter reaches its normal position of rest in order to raise the valve off its seating.

4. Pressure-applying apparatus for fluid-operated wheel-brakes comprising in combination a cylinder to contain the fluid, a piston slidable within said cylinder and having an aperture therein, an operating lever for producing movement of the piston and means for establishing communication between the chamber and a fluid supply, said means comprising a valve of conical form, a stem on said valve slidable lengthwise in the aperture in the piston in the direction of movement of the latter and a head or enlargement on said stem to be engaged by the piston just before the latter reaches its normal position of rest to raise the valve off its seating, and a hollow closed projection formed on the side of the piston remote from the valve to seal the aperture therein and afford a cavity to accommodate the valve stem.

In testimony whereof I affix my signature.

WILLIAM LEICESTER AVERY.